United States Patent
Otake

(10) Patent No.: US 6,178,368 B1
(45) Date of Patent: Jan. 23, 2001

(54) ROLL CONTROL DEVICE OF VEHICLES WITH TRACING OF TURNING COURSE

(75) Inventor: Hirotada Otake, Susono (JP)

(73) Assignee: Toyota Jidosha Kabushiki Kaisha, Toyota (JP)

(*) Notice: Under 35 U.S.C. 154(b), the term of this patent shall be extended for 0 days.

(21) Appl. No.: 09/344,128

(22) Filed: Jun. 24, 1999

(30) Foreign Application Priority Data

Aug. 3, 1998 (JP) .................................................. 10-219225

(51) Int. Cl.$^7$ .............................. B60K 41/20; B62D 6/00
(52) U.S. Cl. .............................. 701/70; 701/72; 701/38; 180/197
(58) Field of Search .................................. 701/70, 72, 78, 701/37, 38, 73, 82, 83, 84, 90, 91; 180/197

(56) References Cited

U.S. PATENT DOCUMENTS

| | | |
|---|---|---|
| 4,625,993 | 12/1986 | Williams et al. ................ 280/5.507 |
| 4,803,627 | 2/1989 | Yasuike et al. ........................ 701/38 |
| 4,807,128 | 2/1989 | Ikemoto et al. ....................... 701/38 |
| 4,809,176 | 2/1989 | Oowa et al. ........................... 701/38 |
| 5,016,910 | 5/1991 | Nagai ................................. 280/5.507 |
| 5,134,352 | 7/1992 | Matsumoto et al. ................. 318/587 |
| 5,640,324 | 6/1997 | Inagaki ................................. 701/70 |
| 5,732,371 | 3/1998 | Fujita .................................... 701/38 |
| 5,772,289 | 6/1998 | Nakazawa et al. ................. 303/9.69 |
| 5,822,709 | 10/1998 | Fujita .................................... 701/70 |
| 5,869,943 | 2/1999 | Nakashima et al. ................. 318/586 |
| 5,899,952 | * 5/1999 | Fukada .................................. 701/74 |
| 5,941,334 | 8/1999 | Inagaki ................................ 180/242 |
| 5,974,221 | * 9/1999 | Taniguchi et al. ................... 180/197 |
| 6,002,974 | 12/1999 | Schiffmann ........................... 701/36 |
| 6,002,975 | 12/1999 | Schiffmann et al. ................. 701/36 |

FOREIGN PATENT DOCUMENTS

| | | |
|---|---|---|
| 63-116918 | 5/1988 | (JP) . |
| 3-70614 | 3/1991 | (JP) . |
| 6-297985 | 10/1994 | (JP) . |
| 10-18215 | 3/1998 | (JP) . |

* cited by examiner

*Primary Examiner*—Tan Nguyen
(74) *Attorney, Agent, or Firm*—Oliff & Berridge, PLC

(57) ABSTRACT

A device for controlling a rolling of a four-wheeled vehicle during a turning, wherein a target deceleration Gxt and a target yaw torque Twt of the vehicle are calculated such as $$Gxt=(R/2Vx)\, Qrs$$

$$Twt=(I/2Vx)\, Qrs$$

wherein R is a radius of curvature of a turning course, Vx is a vehicle speed, I is an inertial yaw moment of the vehicle, Qrs is a target roll suppress quantity indicative of the degree of need of a roll suppress control, and one or both of at least a front pair or a rear pair of wheels are applied with a separately controlled braking so as to generate the target deceleration and the target yaw torque, so as thereby to suppress the rolling of the vehicle body while keeping the course of the turning radius R.

3 Claims, 2 Drawing Sheets

ROLL CONTROL DEVICE OF VEHICLES WITH TRACING OF TURNING COURSE

BACKGROUND OF THE INVENTION

1. Field of the Invention

The present invention relates to a device for controlling the rolling of four-wheeled vehicles, and more particularly, to such a roll control device for four-wheeled vehicles that controls the rolling without disturbing the turning course thereof.

2. Description of the Prior Art

The rolling of a vehicle body of a four-wheeled vehicle during its turn running can be suppressed by decelerating the vehicle or increasing the radius of curvature of the turning course, i.e. drifting out the vehicle, or doing both of these, because the lateral centrifugal force acting at the vehicle body which causes its rolling is proportional to the ratio of the square of the running speed of the vehicle to the radius of curvature of the turning course. Therefore, various roll control devices ever proposed are based upon the principle of decelerating the vehicle or drifting out the vehicle or doing both. A deceleration of a vehicle is of course available by actuating its brake system, while a drifting out of a vehicle is available by selectively actuating such a brake system that is adapted to be able to apply a controlled braking force to each one of the wheels independently of the other.

However, as well known in the art, a braking applied to a wheel necessarily causes a change the slip of the wheel against the road surface, particularly when the vehicle is running along a curved course so critically as to require a roll suppress control. Therefore, there is a problem that the braking for a roll suppress control induces instabilities of the course of driving, including an unintended increase of the radius of curvature of the turning course.

SUMMARY OF THE INVENTION

Therefore, it is a primary object of the present invention to provide a roll control device for four-wheeled vehicles which controls the rolling of the vehicle in reference to a turning course of the vehicle.

In order to accomplish the above-mentioned primary object, the present invention proposes a device for controlling a rolling of a vehicle during a turning, the vehicle having a vehicle body, a pair of front wheels and a pair of rear wheels, a steering system, and a brake system for applying a braking to each wheel of at least one of the front pair and the rear pair of wheels independently of the other of the pair, the device comprising:

means for detecting a speed Vx of the vehicle;

means for detecting a steering angle θ of the steering system;

means for calculating a turning radius R of the turning based upon at least the steeling angle θ detected by the steering angle detection means and the vehicle speed Vx detected by the vehicle speed detection means;

means for calculating a target roll suppress quantity Qrs so as to be indicative of the degree of need of a roll suppress control;

means for calculating a target deceleration Gxt of the vehicle and a target yaw torque Twt of the vehicle such as $Gxt=(R/2Vx) Qrs$ $Twt=(I/2Vx) Qrs$ wherein I is an inertial yaw moment of the vehicle;

means for calculating a slip ratio of each wheel of the at least one pair of front or rear wheels so as to attain the target deceleration Gxy of the vehicle and the target yaw torque Twt of the vehicle; and means for operating the brake system so as to accomplish the calculated slip ratio at each wheel of the at least one pair of front or rear wheels.

As will be appreciated from the following descriptions, when the brake system capable of applying a braking to each whel of at least one of the front pair and the rear pair of wheels independently of the other of the pair is operated so as to decelerate the vehicle to the above-mentioned target deceleration Gxt, while applying the above-mentioned target yaw torque Twt to the vehicle, the rolling of the vehicle body is controlled while maintaining the vehicle to turn along a curved course having a radius of curvature such as R calculated to be due based upon the operation of the steering system and the vehicle speed.

Such a device may further comprise means for detecting a lateral acceleration of the vehicle body, and the target roll suppress quantity calculation means may calculate the target roll suppress quantity Qrs so as to increase at least according to an increase of the magnitude of the lateral acceleration detected by the lateral acceleration detection means.

In order to further improve the operation of such a roll control device as described above, the device may further comprise means for detecting a roll rate of the vehicle body, and the target roll suppress quantity calculation means may calculate the target roll suppress quantity Qrs to be proportional to a sum of a difference between the magnitude of the lateral acceleration detected by the lateral acceleration detection means and a limit value predetermined therefor and an amount which increases in proportion to the roll rate detected by the roll rate detection means.

By such an arrangement, the roll control device can apply a braking for a roll suppress control to a pertinent wheel or wheels with a forecasting estimation of a rolling of the vehicle body, so as thereby to more effectively suppress a rolling of the vehicle body.

BRIEF DESCRIPTION OF THE DRAWINGS

In the accompanying drawings.

DESCRIPTION OF THE EMBODIMENT

In the following, the present invention will be described in more detail in the form of an embodiment with reference to the accompanying drawings.

Figure 1:
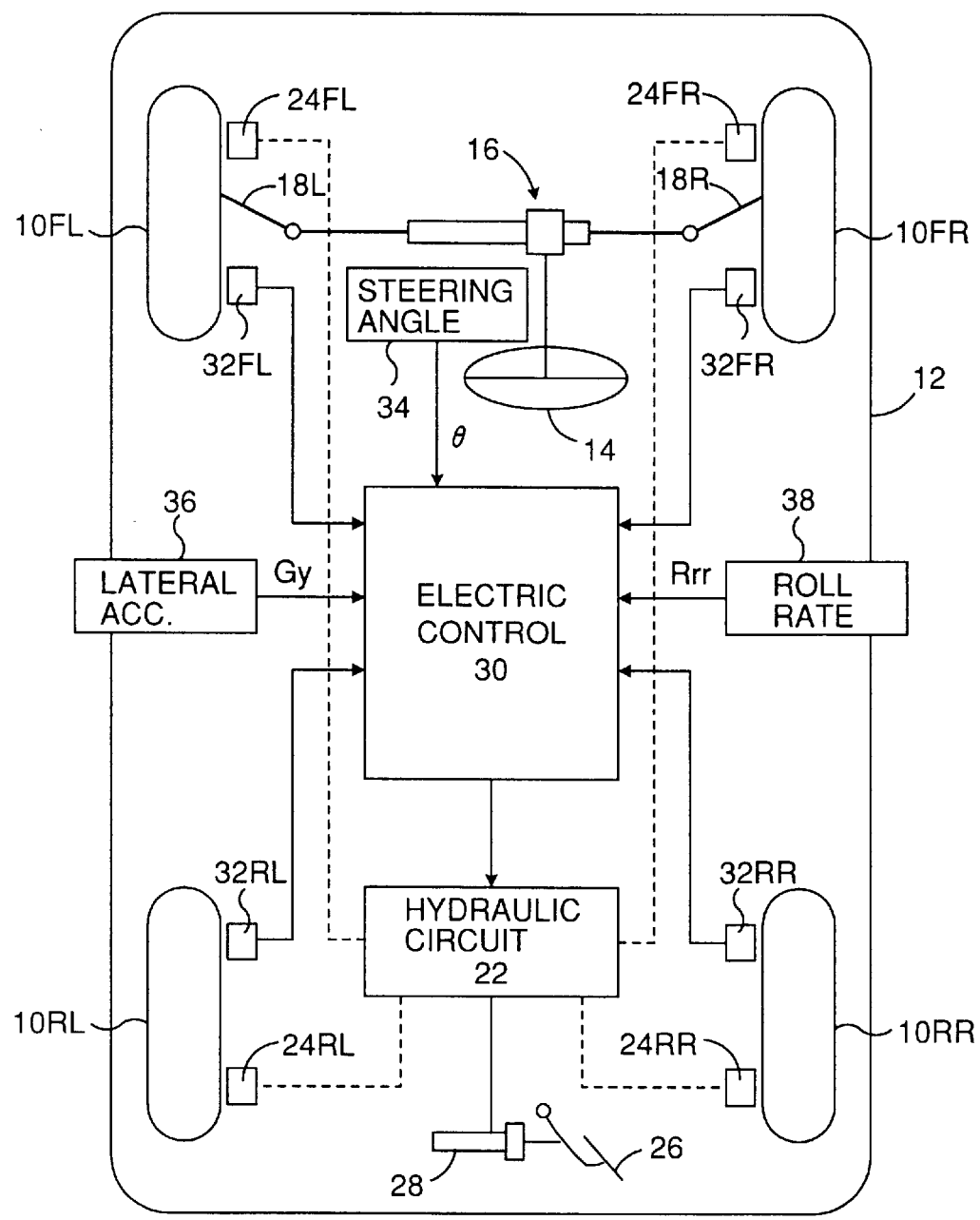
FIG. 1 is a diagrammatical illustration of a four-wheeled vehicle in which the roll control device according to the present invention is incorporated in the form of an embodiment thereof.

Referring to FIG. 1, a four-wheeled vehicle 12 herein shown has a pair of front wheels, i.e. front left and front right wheels 10FL and 10FR, adapted to be steered by a steering system including a steering wheel 14, a rack-and-pinion assembly 16 and connecting rods 18L and 18R, and a pair of rear wheels, i.e. rear left and rear right wheels 10RL and 10RR. The wheels 10FL, 10FR, 10RL and 10RR are equipped with wheel cylinders 24FL, 24FR, 24RL and 24RR, respectively, for applying a braking to the corresponding wheels when a hydraulic pressure is supplied thereto from a hydraulic circuit 22 adapted to be manually controlled according to a depression of a brake pedal 26 by a driver via a master cylinder 28 on one hand, while on the other hand the hydraulic circuit 22 is automatically controlled by electric control means 30 forming an essential part of the roll control device according to the present invention. As well known in the art, the electric control means 30 of this kind include an electronic computer often used in common with other various automatic controls of the vehicle including vehicle stability controls such as a spin suppress control and a driftout suppress control. The electronic computer may be of a conventional type including a central processor unit, a read only memory, a random access memory, input and output port means and a common bus interconnecting these elements.

The electronic control means 30 are generally supplied with various signals from various sensors. However, FIG. 1 shows only limited ones of those sensors essential for the shown embodiment of the roll control device according to the present invention. 32FL, 32FR, 32RL and 32RR are wheel speed sensors for detecting wheel speed of the front left, front right, rear left and rear right wheels 10FL, 10FR, 10RL and 10RR, respectively. 34 is a steering angle sensor for detecting a turning angle of an optional part of the steering system including the steering wheel 14, etc. to provide a signal indicating a steering angle θ. 36 is a lateral acceleration sensor for detecting a lateral acceleration Gy of the vehicle body at its center of gravity to provide a signal indicating the lateral acceleration. 38 is a roll rate sensor for detecting a roll rate Rrr, i.e. an angular velocity of the rolling of the vehicle body around a rolling axis determined by the geometry of the vehicle.

Figure 2:
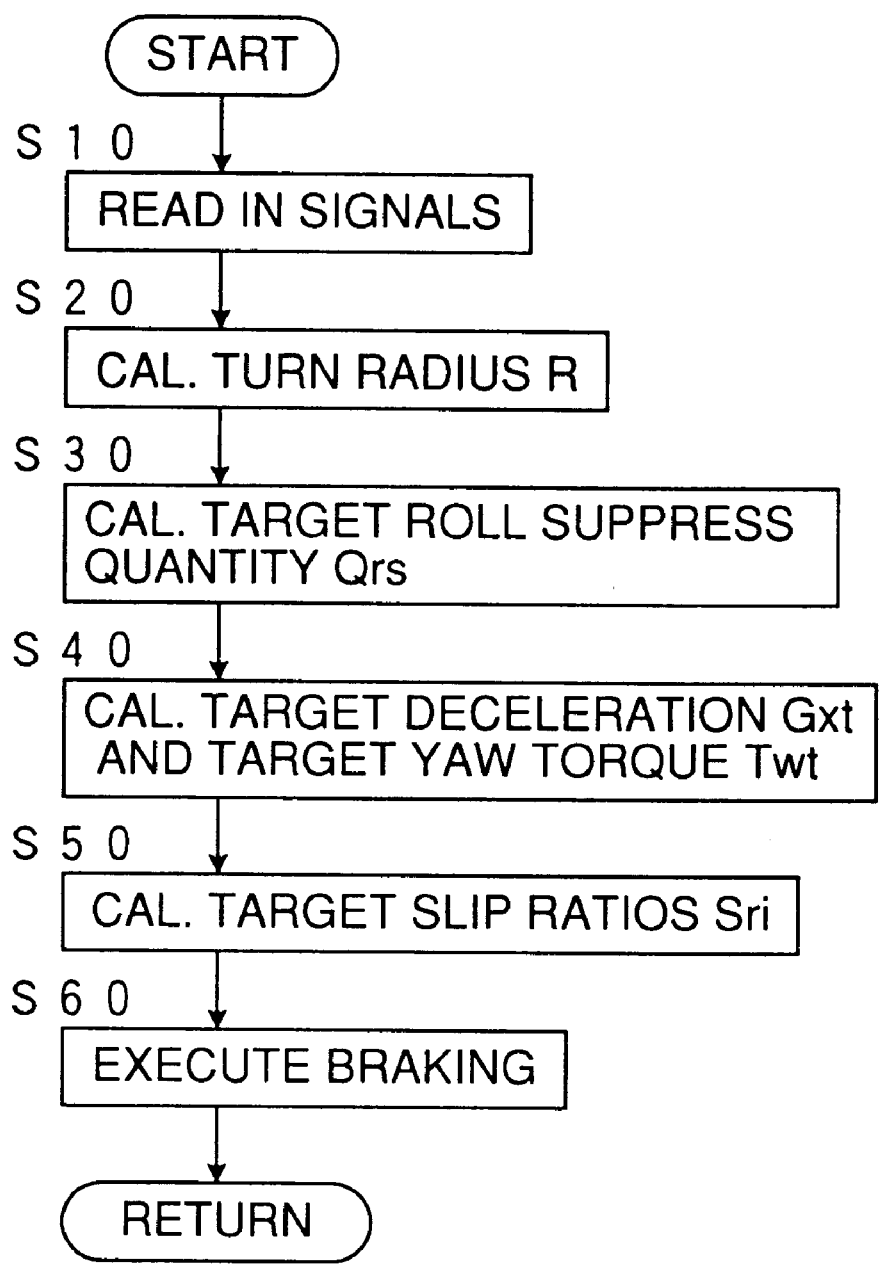
FIG. 2 is a flowchart showing the operation of the roll control device shown in FIG. 1.

Further details of the shown embodiment will be described in the form of its operation by referring to FIG. 2 showing the operation in the form of a flowchart. The roll control device is started to operate by a closure of an ignition switch (not shown) of the vehicle, and the control through the flow chart is continuously repeated until the ignition switch is opened.

When the operation is started, or returned after each pass therethrough, in step 10, signals are read in from those sensors described above.

In step 20, a turn radius R, i.e. the radius of curvature of a turning course of the vehicle is calculated based upon at least the steering angle θ detected by the steering angle sensor 34, and a vehicle speed which will be denoted Vx hereinbelow. The vehicle speed Vx may be calculated from one of the wheel speeds detected by the wheel speed sensors 32FL-32RR, particularly that of the front wheel serving at the inside of the turn at which the slip of the wheel is generally minimum, or may be determined by other treatment of a plurality of wheel speeds.

In step 30, the above-mentioned target roll suppress quantity Qrs is calculated according to the following concept:

Since the angle of the rolling of the vehicle body elastically supported on the wheels via an elastic wheel suspension system is primarily determined by a balance between the lateral acceleration of the vehicle body due to the centrifugal force generated by a turn driving of the vehicle and the spring force of the elastic wheel suspension system, the quantity of executing a roll suppress control should primarily include the magnitude of the lateral acceleration Gy of the vehicle body, and more particularly, an increase thereof beyond a certain standard limit. Therefore, primarily, the target roll suppress quantity Qrs is calculated, by denoting such a standard limit as Gylim, and by determining an appropriate proportioning factor $K_1$, to be proportional to $|Gy|-Gylim$, such as:

$$Qrs = K_1(|Gy| - Gylim) \quad (1)$$

However, since the vehicle body of the four-wheeled vehicle suspended on the four-wheels via the elastic wheel suspension system is an oscillatory system liable to a swinging, it is contemplated, for a further improvement of the control, that the standard limit Gylim is decreased along with increase of a dynamic aspect of the rolling, such as $$Gylim = Gylimo(1 - K_2 Rrr) \quad (2)$$

wherein Gylimo is a value of the standard limit based upon a nominal concept of the rolling, while $K_2$ is a factor for reflecting the dynamic aspect of the rolling represented by the roll rate Rrr on a due value of the standard limit. Therefore, the target roll suppress quantity Qrs may be more desirably calculated as follows:

$$Qrs = K_1\{|Gy| - Gylimo(1 - K_2 Rrr)\} = K_1(|Gy| - Gylimo) + K_1 K_2 Gylimo\, Rrr \quad (3)$$

In step 40, the above-mentioned target deceleration Gxt and the target yaw torque Twt are calculated according to the following concept:

When the vehicle turns along a circular course of the turn radius R, the following conditions are satisfied:

$$Vx = \gamma \times R \quad (4)$$

$$Gy = \gamma \times Vx \quad (5)$$

By differentiating equations 4 and 5 by time $$dVx/dt = R(d\gamma/dt) \quad (6)$$

$$dGy/dt = (d\gamma/dt)Vx + \gamma(dVx/dt) \quad (7)$$

From equations 6 and 7, the following equations are obtained:

$$dVx/dt = (R/2Vx)(dGy/dt) \quad (8)$$

$$d\gamma/dt = (1/2Vx)(dGy/dt) \quad (9)$$

Substituting $dVx/dt$ by Gx, and multiplying both sides of equation 9 by the inertial yaw moment I of the vehicle, equations 8 and 9 are rewritten as follows:

$$Gx = (R/2Vx)(dGy/dt) \quad (10)$$

$$Tw = (I/2Vx)(dGy/dt) \quad (11)$$

Therefore, when the braking is controlled such that the vehicle is thereby decelerated at a deceleration X, while the vehicle is thereby applied with a yaw torque Y under the condition that $X/(R/2Vx)$ is equal to $Y/(I/2Vx)$, the vehicle will be driven along a curved course of the turn radius R estimated based upon at least the steeling angle and the vehicle speed.

When the brake system can apply a braking to each wheel of at least one of the front pair and the rear pair of wheels independently of the other of the pair, it will be a matter of design for those skilled in the art to control such a brake system so as to decelerate the vehicle at the deceleration X while applying a yaw torque Y thereto by keeping the condition that that X/(R/2Vx) is equal to Y(I/2Vx). In general, the relationship among the longitudinal and lateral forces of each of four wheels and the yaw torque in a four-wheeled vehicle are expressed as follows:

$$Twfl = \left[-\frac{Tr}{2} Lf\right]\left[\begin{array}{c}Fxfl\\Fyfl\end{array}\right]$$

$$Twfr = \left[\frac{Tr}{2} Lf\right]\left[\begin{array}{c}Fxfr\\Fyfr\end{array}\right]$$

$$Twrl = \left[-\frac{Tr}{2} - Lr\right]\left[\begin{array}{c}Fxrl\\Fyrl\end{array}\right]$$

$$Twrr = \left[\frac{Tr}{2} - Lr\right]\left[\begin{array}{c}Fxrr\\Fyrr\end{array}\right]$$

wherein Fxfl, Fxfr, Fxrl and Fxrr and Fyfl, Fyfr, Fyrl and Fyrr are the longitudinal forces and lateral forces of the front left, front right, rear left and rear right wheels, respectively, Twfl, Twfr, Twrl and Twrr are shares of the yaw torque by the front left, front right, rear left rear and right wheels, Tr is the tread, and Lf and Lr are the distance between the front and rear axles and the center of gravity of the vehicle, respectively.

Now, the matter of control is to determine the magnitude of dGy/dt in equations 10 and 11. The primary object of the control is of course to suppress the rolling of the vehicle body within a desirable magnitude, and it was estimated above that an amount such as Gylim=Gylimo ($1-K_1$ Rrr) has a particular effect as a limit in the term of the lateral acceleration of the vehicle body, and that when the lateral acceleration Gy of the vehicle body is controlled not to exceed Gylim, the rolling of the vehicle body will be suppressed within a certain desirable limit. In view of this, it is contemplated to control the deceleration Gx and the yaw torque Tw based upon the difference of the lateral acceleration Gy against Gylim, i.e. the above calculated target roll suppress quantity Qrs, so as to set up the target deceleration Gxt and the target yaw torque Twt as follows:

$$Gxt=(R/2Vx)\ Qrs \qquad (12)$$

$$Twt=(I/2Vx)\ Qrs \qquad (13)$$

By the brake system being actuated so as to decelerate the vehicle at such a deceleration as Gx, while the vehicle is thereby applied with such a yaw torque as Twt, the vehicle which has started to turn at a turn radius such as R will be kept on to turn along the curve of the turn radius R, with the rolling of the vehicle body being suppressed not to exceed a desirable limit corresponding to the lateral acceleration Gylimo, when the factors $K_1$ and $K_2$ are appropriately determined.

In step 50, a calculation is made for a target slip ratio of each of a wheel or wheels of at least the front pair or rear pair of wheels selected for the roll control which is required for generating the deceleration Gxt and the yaw torque Twt.

In step 60, the brake system is operated so as to effect the above calculated slip ratio in the pertinent wheel or wheels.

Thus, it will be appreciated that the object of the invention is accomplished by the device of the present invention which may be constructed as described in detail in the above as an embodiment thereof.

Although the present invention has been described in detail with respect to a preferred embodiment thereof, it will be apparent for those skilled in the art that various modifications are possible with respect to the shown embodiment within the scope of the present invention.

What is claimed is:

1. A device for controlling a rolling of a vehicle during a turning, the vehicle having a vehicle body, a pair of front wheels and a pair of rear wheels, a steering system, and a brake system for applying a braking to each wheel of at least one of the front pair and the rear pair of wheels independently of the other of the pair, the device comprising:

means for detecting a speed Vx of the vehicle;

means for detecting a steeling angle θ of the steeling system;

means for calculating a turning radius R of the turning based upon at least the steering angle θ detected by the steering angle detection means and the vehicle speed Vx detected by the vehicle speed detection means;

means for calculating a target roll suppress quantity Qrs so as to be indicative of the degree of need of a roll suppress control;

means for calculating a target deceleration Gxt of the vehicle and a target yaw torque Twt of the vehicle as follows $$Gxt=(R/2Vx)\ Qrs$$

$$Twt=(I/2Vx)\ Qrs$$

wherein I is an inertial yaw moment of the vehicle;

means for calculating a slip ratio of each wheel of the at least one pair of front or rear wheels so as to attain the target deceleration Gxy of the vehicle and the target yaw torque Twt of the vehicle; and means for operating the brake system so as to accomplish the calculated slip ratio at each wheel of the at least one pair of front or rear wheels.

2. A device according to claim 1, wherein the device further comprises means for detecting a lateral acceleration of the vehicle body, and the target roll suppress quantity calculation means calculate the target roll suppress quantity so as to increase at least according to an increase of the magnitude of the lateral acceleration detected by the lateral acceleration detection means.

3. A device according to claim 1, wherein the device further comprises means for detecting a lateral acceleration of the vehicle body, and means for detecting a roll rate of the vehicle body, and the target roll suppress quantity calculation means calculate the target roll suppress quantity to be proportional to a sum of a difference between the magnitude of the lateral acceleration detected by the lateral acceleration detection means and a limit value predetermined therefor and an amount which increases in proportion to the roll rate detected by the roll rate detection means.

* * * * *